United States Patent
Chuang et al.

(10) Patent No.: US 9,679,840 B2
(45) Date of Patent: Jun. 13, 2017

(54) METHOD FOR LAYOUT DESIGN AND STRUCTURE WITH INTER-LAYER VIAS

(71) Applicant: TAIWAN SEMICONDUCTOR MANUFACTURING COMPANY, LTD., Hsinchu (TW)

(72) Inventors: Yi-Lin Chuang, Taipei (TW); Ching-Fang Chen, Taichung (TW); Jia-Jye Shen, Jhubei (TW)

(73) Assignee: TAIWAN SEMICONDUCTOR MANUFACTURING COMPANY, LTD. (TW)

( * ) Notice: Subject to any disclaimer, the term of this patent is extended or adjusted under 35 U.S.C. 154(b) by 78 days.

(21) Appl. No.: 14/220,751

(22) Filed: Mar. 20, 2014

(65) Prior Publication Data

US 2015/0270214 A1    Sep. 24, 2015

(51) Int. Cl.
*G06F 17/50* (2006.01)
*H01L 23/522* (2006.01)
*H01L 23/528* (2006.01)

(52) U.S. Cl.
CPC ...... *H01L 23/5226* (2013.01); *G06F 17/5072* (2013.01); *G06F 17/5077* (2013.01); *G06F 17/5081* (2013.01); *G06F 2217/84* (2013.01); *H01L 23/5286* (2013.01); *H01L 2924/0002* (2013.01)

(58) Field of Classification Search
CPC .................................................. G06F 17/50
USPC .................................................. 716/119
See application file for complete search history.

(56) References Cited

U.S. PATENT DOCUMENTS

| | | | |
|---|---|---|---|
| 8,803,206 B1* | 8/2014 | Or-Bach ............... | H01L 27/098 257/278 |
| 2007/0188188 A1* | 8/2007 | Or-Bach .......... | H03K 19/17728 326/38 |
| 2014/0145272 A1* | 5/2014 | Or-Bach ............. | H01L 27/0688 257/369 |

* cited by examiner

*Primary Examiner* — Thuan Do
(74) *Attorney, Agent, or Firm* — Hauptman Ham, LLP

(57) ABSTRACT

A computer implemented layout method for an integrated circuit (IC) structure and IC structure are provided. The layout method can include placing a circuit cell and an inter-layer via together in a first device layer of the IC structure, and placing a metal pattern in a second device layer of the IC structure. The inter-layer via and the metal pattern may be configured to form a direct connection channel for the circuit cell and the metal pattern.

20 Claims, 4 Drawing Sheets

METHOD FOR LAYOUT DESIGN AND STRUCTURE WITH INTER-LAYER VIAS

BACKGROUND

Integrated circuit (IC) structures and design have experienced continuous and rapid improvement with the increase in manufacturing capabilities and reduction in chip size. Improvements in integration density may be attributed to repeated reduction in minimum feature size which allows for more components to be integrated into a given chip area. Improvements in planar processing and integrated circuits formed by planar processing are challenged by physical limitations posed by density complexity of reduction in size.

Large scale integrated circuit (IC) chips include many circuit elements. IC design often requires considerable effort for placement of cells. Place and route programs are often used to create IC chip layouts. Some placement tools cannot handle cell placement well. IC chips require routing overheads to connect different portions of the IC chip.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DESCRIPTION

Figure 1:
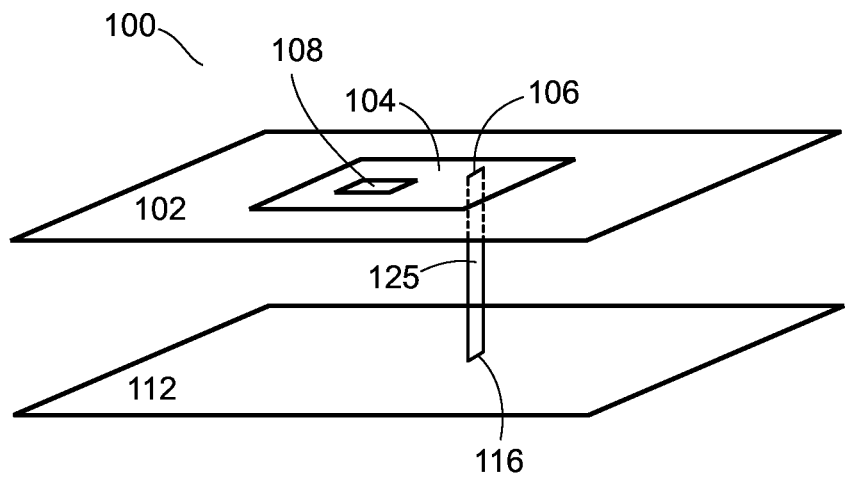
FIG. 1 illustrates a monolithic three dimensional (3D) IC structure in accordance with some embodiments.

The following disclosure provides many different embodiments, or examples, for implementing different features of the provided subject matter. Specific examples of components and arrangements are described below to simplify the present disclosure. These are merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

One aspect of the disclosure relates to three dimensional (3D) IC structures and chips. In an embodiment, structural elements and configurations are provided for monolithic three dimensional (3D) ICs and chips. Another aspect of the disclosure relates to a method for layout design, such as a design method for connecting circuit cells in different device layers. Various embodiments of the present disclosure will be described hereinafter with reference to the attached drawings.

FIG. 1 illustrates a monolithic three dimensional (3D) IC structure 100 in accordance with various embodiments. The monolithic 3D IC structure 100 includes a device layer 102 and a device layer 112. Device layer 102 includes a circuit cell 104. In an embodiment, circuit cell 104 is placed in the device layer 102. According to another embodiment, circuit cell 104 and an inter-layer via 125 are bundled, as shown in FIG. 1. In some embodiments, bundling circuit cell 104 and inter-layer via 125 refers to treating circuit cell 104 and inter-layer via 125 as if they were an integral unit during a placement stage. In some embodiments, bundling circuit cell 104 and inter-layer via 125 refers to including a predetermined location for connecting inter-layer via 125 within a cell boundary of circuit cell 104. In an embodiment, bundling includes placing the circuit cell 104 and a portion of inter-layer via 125 in device layer 102 in close proximity to and/or coupled with a particular location, such as a location 106. In another embodiment, bundling includes configuring the circuit structure of the circuit cell 104 and inter-layer via 125 to provide a direct connection between circuit cell 104 and a different layer, such as device layer 112. In an embodiment, the direct connection provided by inter-layer via 125 is usable to carry a supply power voltage, an analog signal, or a logic signal.

In an embodiment, inter-layer vias, such as inter-layer via 125, connect circuit elements in the device layer 102 with circuit elements in the device layer 112. In some embodiments, by using inter-layer via 125, power supply metal lines, such as a metal pattern 217 or a metal pattern 237 in FIG. 2, become shorter and/or fewer due to the direct connection between layers 102 and 112. In comparison to routing connections to the outer perimeter of a layer, inter-layer vias, such as inter-layer via 125, can provide shorter connections for monolithic 3D IC 100. In an embodiment, inter-layer vias, such as inter-layer via 125, allow for shorter connections within monolithic 3D IC 100 which results in power consumption reduction of the monolithic 3D IC 100 and lowered routing overheads. By way of example, inter-layer via 125 provides a shorter path between layers 102 and 112 compared to running a connection to the edge of a layer for routing along the side of 3D IC 100. Thus, in some embodiments, bundling an inter-layer via, such as inter-layer via 125, with a circuit cell reduces the amount of power supply routing and eases routing overheads by reducing the amount of routing in the 3D IC 100.

In some embodiments, inter-layer vias, such as inter-layer via 125, have a small feature size, such as a footprint of 0.05 $\mu m \times 0.05$ $\mu m$. In some embodiments, circuit cells have a footprint of 0.54 $\mu m \times 0.48$ $\mu m$. By providing a small feature size, inter-layer via 125 provides greater density and flexibility in designing a monolithic 3D IC structure. Inter-layer via 125 provides greater flexibility by allowing for more placement locations due to the small feature size. In comparison, through-silicon-vias of other approaches have a typical feature size of 6 $\mu m \times 6$ $\mu m$.

Inter-layer via 125 as shown in FIG. 1 is illustrated as a vertical structure. In an embodiment, inter-layer via 125 is vertical, or substantially vertical to connect layers 102 and 112. In some embodiments, inter-layer via 125 is vertically straight, or substantially vertical to connect layers 102 and 112. In another embodiment, the inter-layer vias, such as inter-layer via 125, vary in shape to allow for a slanted or offset vertical connection, and include multiple layers of materials and landing structures.

In an embodiment, the device layer 102 and device layer 112 have different power supply voltages. Circuit cell 104 is configured to receive power, such as a power supply line voltage (e.g., VDD). An exemplary power supply line voltage (VDD) received by circuit cell 104 is 3.3 volts (V). In other embodiments, voltage level shifter 108 of circuit cell 104 is configured to provide a multilevel supply power, such as one or more of a high supply voltage (e.g., VDDH) and low supply voltage (e.g., VDDL). In an embodiment, a voltage level shifter 108 is provided to facilitate both signal communication and power distribution. For instance, the device layer 102 may have a 3.3 V high voltage power supply (VDD) which is supplied from outside the monolithic 3D IC chip 100. The device layer 112 may have a 1.2 V high supply voltage (VDDH) which is supplied from the device layer 102. In an embodiment, the circuit cell 104 uses the voltage level shifter 108 to convert a 3.3V power input to a 1.2V power output to be supplied to the device layer 112 through the inter-layer vias 125. In some embodiments, in addition to a power connection, inter-layer vias, such as inter-layer via 125, also include signal or control connections, the voltage of which is also converted by a voltage level shifter, such as voltage level shifter 108.

In an embodiment, monolithic 3D IC 100 is an integrated circuit structure that contains active and passive devices (e.g., transistors, diodes, resistors, capacitors, etc.) that are made in and on the surface of a semiconductor material, such as a silicon (Si) wafer. In an embodiment, monolithic 3D IC 100 includes a single block or monolithic structure interconnected to an insulating layer over the structure, and one or more device layers, such as device layer 102, to produce a solid integral monolithic-IC. In an embodiment, devices (e.g., transistors, diodes, resistors and capacitors) of monolithic 3D IC 100 are fabricated on the same single chip of a single silicon crystal to include isolated p-n junctions, and interconnections adjacent to insulator layers or regions of device layers 102 and 112 without shorting adjacent areas. The inter-layer via 125 is an example of an interconnection between one or more device layers.

As shown in FIG. 1, the device layers, such as device layer 102 and device layer 112, are formed based on a monolithic semiconductor body in the monolithic 3D IC 100. The device layer 102 and device layer 112 each include active elements, in some embodiments. By way of example, active elements include logic circuitry and/or memory circuitry. According to an embodiment, inter-layer vias, such as the inter-layer via 125, are placed anywhere within the area of any circuit level.

During a layout process, inter-layer via 125 may be bundled, or placed together, with the circuit cell 104. In an embodiment, a place and route computer program places inter-layer via 125 and circuit cell 104 together. In an embodiment, placing a circuit cell, such as circuit cell 104, includes designing the position/location of the circuit cell in a device layer, such as device layer 102. During manufacturing of the 3D IC 100, inter-layer vias, such as inter-layer via 125 may be formed according to the layout to directly connect circuits of device layer 102 at location 106 to elements at a location 116 in the device layer 112.

Figure 2:
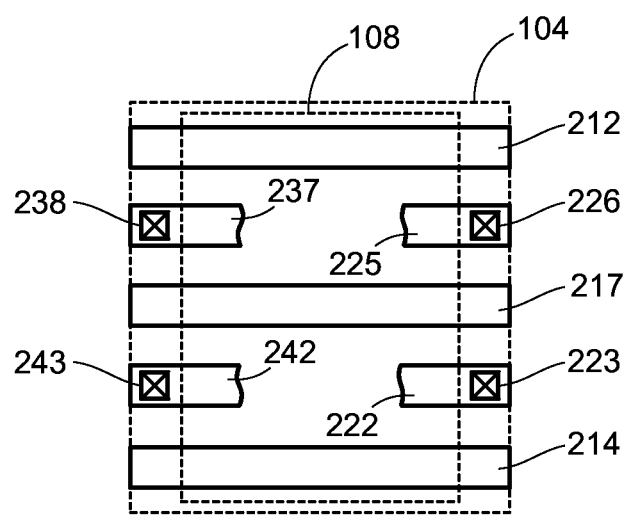
FIG. 2 is a layout view of a circuit cell bundled with inter-layer vias in accordance with some embodiments.

FIG. 2 is a layout view of the circuit cell 104 bundled with an inter-layer via according to an embodiment. The circuit cell 104 includes the voltage level shifter 108, a plurality of metal patterns 212, 214, 217, 222, 225, 237 and 242, and a plurality of inter-layer vias 223, 226, 238 and 243. In an embodiment, inter-layer vias 223, 226, 238 and 243 are connections similar to the inter-layer via 125 of FIG. 1. In an exemplary embodiment, inter-layer vias 223, 226, 238 and 243 each include one or more metal layers and via material to electrically connect device layer 102 and device layer 112. In another embodiment, inter-layer vias 223, 226, 238 and 243 are each an inter-layer via like the inter-layer via 125 of FIG. 1. The metal patterns 222, 225, 237 and 242 overlay the inter-layer vias 223, 226, 238 and 243, respectively.

In an embodiment, the metal patterns 212 and 214 are exemplary ground lines (GND). The metal pattern 217 receives power supply line voltage (VDD), such as 3.3V, in some embodiments. The metal pattern 237 is an exemplary supply line to provide voltage converted by voltage level shifter 108. In an embodiment, voltage level shifter 108 of circuit cell 104 is configured to provide a multilevel supply power, such as one or more of a high supply voltage (e.g., VDDH) and low supply voltage (e.g., VDDL), to metal pattern 237. In an exemplary embodiment, metal pattern 237 supplies high supply voltage (VDDH) which is tied to VDD, or in some cases lower than the VDD. Alternatively, metal pattern 237 supplies low supply voltage (VDDL) which is lower than the VDDH. The voltage level shifter 108 converts VDD from metal pattern 217 to VDDH or VDDL for metal pattern 237 for use by circuit cells of device layers 102 and 112. The metal patterns 222, 225 and 242 are exemplary input, enable and output signal lines, respectively. References to metal patterns, such as metal pattern 217 and 237 may relate to power rails of the IC structure of FIG. 2. In other embodiments, circuit cell 104 is configured to provide a multi-level supply, such as one or more of a high supply voltage (e.g., VDDH) and low supply voltage (e.g., VDDL).

In an embodiment, the inter-layer vias 223, 226, 238 and 243 are bundled with the voltage level shifter 108. In an embodiment, bundling of inter-layer vias 223, 226, 238 and 243 with the voltage level shifter 108 includes placing the voltage level shifter 108 and a portion of inter-layer vias 223, 226, 238 and 243 in device layer 102 in close proximity to and/or coupled with a particular location, such as location 106, of circuit cell 104. A place and route computer program will place the circuit cell 104 together with inter-layer vias 125 in location 106 of device layer 102. In an embodiment, four landing metal patterns, not shown in FIG. 2, for the inter-layer vias 223, 226, 238 and 243 will be placed in a corresponding layer, such as layer 112 of FIG. 1, and in alignment with inter-layer vias 223, 226, 238 and 243 in layer 112. In an embodiment, the landing metal patterns on two different device layers are aligned when metal patterns share a vertically overlapping area. In an embodiment, other kinds of circuit cells, such as a logic cell, are bundled with inter-layer vias 223, 226, 238 and 243.

In an embodiment, circuit cell 104 is bundled with inter-layer vias 223, 226, 238 and 243 to allow for point-to-point connection. By way of example, circuit cell 104 may be aligned with and/or correspond to the location of metal pattern 217, which is an exemplary first high voltage power supply line (VDD), and another rail of the circuit device 104 aligns with an interlayer metal pattern 237, which is an exemplary second high voltage power supply line (VDDL).

In FIG. 2, metal patterns 222, 225, 237 and 242 are configured to be coupled to at least one set of circuit devices between the metal patterns 212 and 214 (GND). It should be appreciated that additional sets of circuit devices may be included in the circuit cell 104 between metal patterns 222, 225, 237 and 242.

Figure 3:
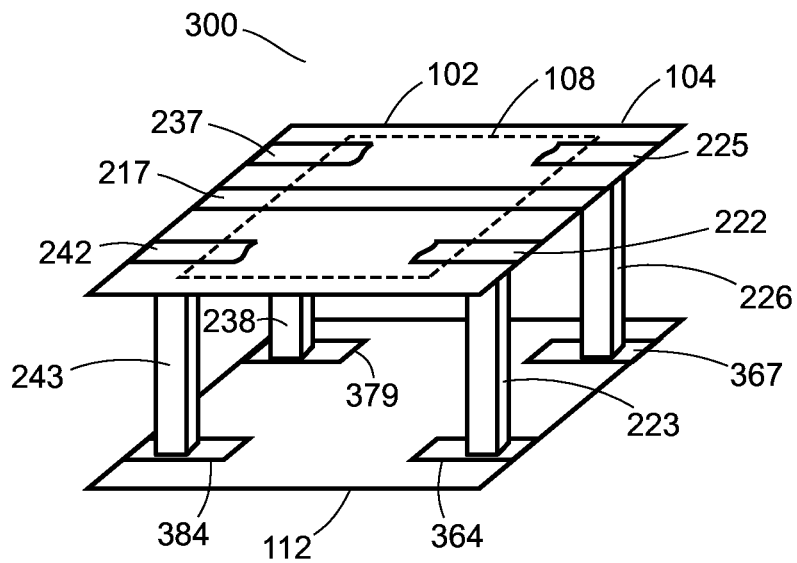
FIG. 3 is another view of the monolithic 3D IC structure of FIG. 1 according to an embodiment.

FIG. 3 is another representation of the monolithic 3D IC structure of FIGS. 1 and 2, in accordance with some embodiments. The monolithic 3D IC chip 300 includes circuit cell 104 placed in device layer 102, shown as an upper layer. The circuit cell 104 includes the voltage level shifter 108 and the metal patterns 222, 225, 237 and 242 which connect the voltage level shifter 108 to various other circuits (not shown) in the device level 102. The metal patterns 222, 225, 237 and 242 overlay the inter-layer vias 223, 226, 238 and 243, respectively. During a design process, a computer implemented place and route program places the voltage level shifter 108, the metal patterns 222, 225, 237 and 242 and the inter-layer vias 223, 226, 238 and 243 together as a bundled device. The place and route program also places corresponding metal patterns 364, 367, 379 and 384, which are vertically aligned to the inter-layer vias 223, 226, 238 and 243, respectively, in the lower device layer 112. The metal patterns 364, 367, 379 and 384 lead to other circuit cells (not shown in FIG. 3) in the lower device layer 112. As a result, the voltage level shifter 108 in the device layer 102 and circuits in the lower device layer 112 are connected through the inter-layer vias 223, 226, 238 and 243 and the metal patterns 222, 225, 237, 242, 364, 367, 379 and 384. In some embodiments, the inter-layer vias 223, 226, 238 and 243 are configured to carry a power supply voltage, an analog signal, or a logic signal. Because the inter-layer vias 223, 226, 238 and 243 are bundled with the voltage level shifter 108, power distribution for layer 112 can be reduced and routing congestion of monolithic 3D IC chip 300 can be reduced due to chip area not used for power distribution in layer 112. In some embodiments, the inter-layer vias 223, 226, 238 and 243 are formed by a monolithic 3D IC process or by other inter-layer via formation processes.

Referring again to FIG. 3, layer 102 may have multiple metal and insulation layers for metal patterns 217, 222, 225, 237 and 242 according to various embodiments of the present disclosure. Metal patterns 217, 222, 225, 237 and 242 can be in different metal layers, and associated inter-layer vias 223, 226, 238 and 243 can be in different metal layers. Similarly, the metal patterns 364, 367, 379 and 384 can be in different metal layers.

In an embodiment, the structure shown in FIG. 3 can be made into a cube cell 300, e.g., the metal patterns 364, 367, 379 and 384 in the lower device layer 112 can be aligned with the circuit cell 104 that includes the voltage level shifter 108 and inter-layer vias 223, 226, 238 and 243. Instead of separately placing circuit cell 104 in layer 102 and placing the corresponding metal patterns 364, 367, 379 and 384 in another device layer, a place and route computer program can place the cube cell 300 in a monolithic 3D IC design in locations, such as location 106, to provide inter-layer connections between device layer 102 and device layer 112. In an embodiment, a place and route computer program can perform connections within layer 102 or 112, with the cube cell 300. In an embodiment, metal patterns 364, 367, 379 and 384 in the lower device layer 112 provide power or signaling connections within layer 112.

Figure 4:
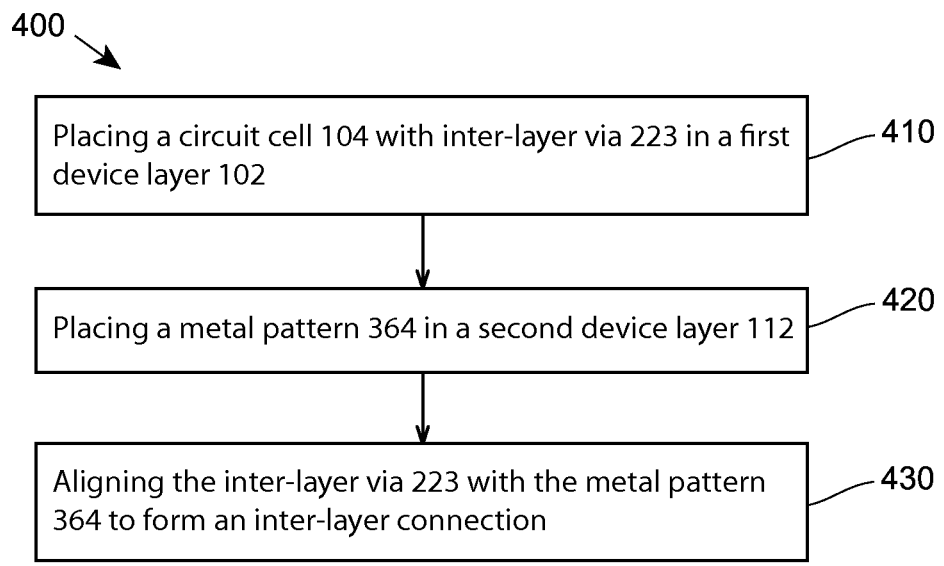
FIG. 4 is a flow-chart illustrating a computer implemented layout method for placing circuit cells with bundled inter-layer vias in accordance with some embodiments.

FIG. 4 is a flow-chart illustrating a computer implemented layout method 400 for placing circuit cell 104 with inter-layer vias, such as inter-layer via 125, according to various embodiments of the present disclosure. The layout method 400 includes placing circuit cells, such as circuit cell 104. In block 410, the layout method includes placing the circuit cell 104 of FIG. 3 in a first device layer 102. The circuit cell 104 can include voltage level shifter 108 and a bundled inter-layer via, such as inter-layer via 223 of FIG. 3. In block 420, the layout method places an exemplary metal pattern 364 in a second device layer 112 as shown in FIG. 3. The metal pattern 364 connects to other circuits in the second device layer 112. In block 430, the layout method aligns the inter-layer via 223 to correspond with the location of the metal pattern 364 and thus, to form an inter-layer connection that provides a direct connection between the circuit cell 104 in the first device layer 102 and circuits in the second device layer 112.

Figure 5:
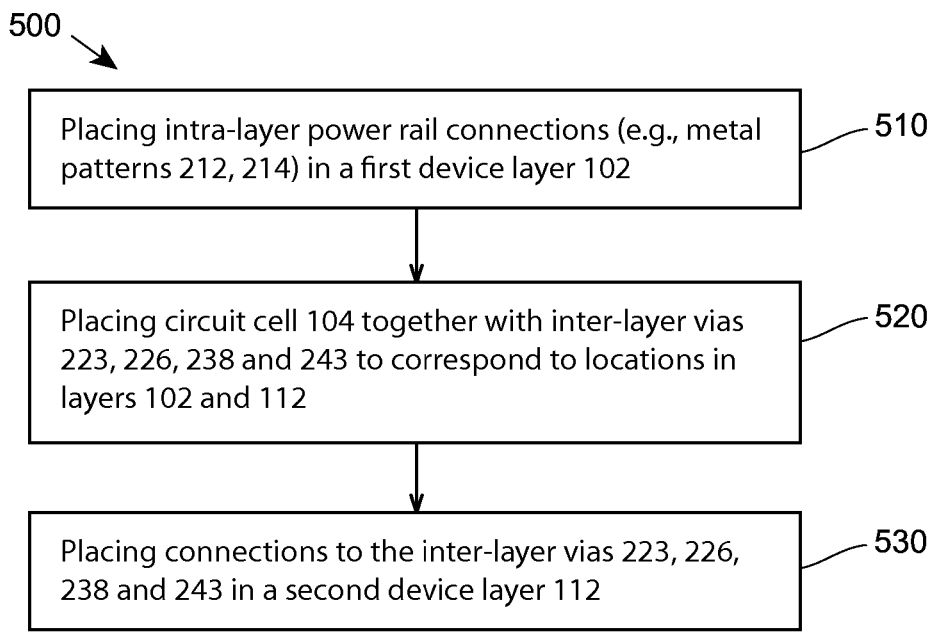
FIG. 5 is a flow-chart illustrating a computer implemented layout method for designing power supply network in a monolithic 3D IC chip in accordance with some embodiments.

FIG. 5 is a flow-chart illustrating a computer implemented layout method 500 for placing elements in a monolithic 3D IC chip in accordance with some embodiments. The method of FIG. 5 may be implemented by a place and route program. In block 510, the place and route program places intra-layer power rail connections, such as metal patterns 212 and 214, in a first device layer 102. In an embodiment, intra-layer power rail connections, such as metal patterns 212 and 214, are connections within a layer 102. In block 520, the place and route program places a bundled device, such as circuit cell 104 bundled with inter-layer vias 223, 226, 238 and 243 as shown in FIG. 3, to correspond with locations in layers 102 and 112. In an embodiment, inter-layer vias 223, 226, 238 and 243 may be aligned with and/or correspond to the location of metal patterns 222, 225, 237 and 238 of layer 112 in locations which reduce the routing overhead of the 3D IC chip. In block 530, the place and route program places connections to the inter-layer vias 223, 226, 238 and 243 to the metal patterns 364, 367, 379 and 384 in device layer 112. In an embodiment, metal patterns 364, 367, 379 and 384 are associated with one or more power supply connections for device layer 112.

Figure 6:
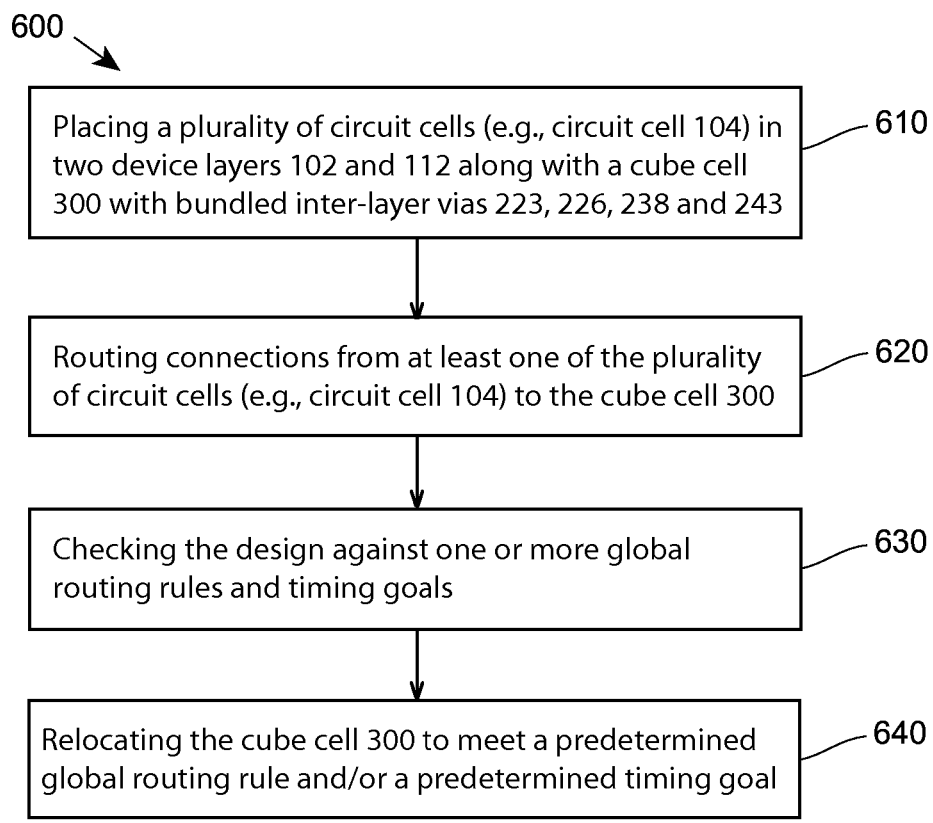
FIG. 6 is a flow-chart illustrating a computer implemented layout method for designing a monolithic 3D IC in accordance with some embodiments.

FIG. 6 is a flow-chart illustrating a computer implemented layout method 600 for designing a monolithic 3D IC in accordance with some embodiments. In block 610, a place and route program places a plurality of circuit cells, such as circuit cell 104, in two device layers, such as layers 102 and 112, along with a cube cell, such as the cube cell 300 of FIG. 3. The cube cell 300 of FIG. 3, with bundled inter-layer vias 223, 226, 238 and 243, may be placed in block 610 for connecting circuit cells, such as circuit cell 104, placed in various device layers, such as layers 102 and 112. In block 620, the place and route program routes connections from at least one of the plurality of circuit cells, such as circuit cell 104, of the cube cell 300 to create a monolithic 3D IC design. In block 630, an evaluating program is executed on the monolithic 3D IC design for checking the design against one or more predetermined global routing rules and timing goals. Therefore, in some embodiments, the occurrence of global routing and timing violations is evaluated, and individual violates are identified. If any violation is discovered in block 630, the place and route program may relocate the cube cell 300 in block 640 to meet a predetermined global routing rule and/or a predetermined timing goal. In an embodiment, a global routing rule may be provided by a chip foundry to ensure that a layout for an IC design can be correctly and satisfactorily manufactured. In an embodiment, one or more timing goals may be set by an IC circuit designer to configure different parts of the IC chip to work synchronously and to achieve an overall speed goal. In some embodiments, blocks 630 and 640 are executed repeatedly to iteratively reduce routing congestion and improve timing margins, as locations of circuit cell 104 are determined. For example, the place and route program may relocate the cube cell 300 in block 640 if any violation is discovered in block 630, and can continue to evaluate locations for placing the cube cell 300.

Figure 7:
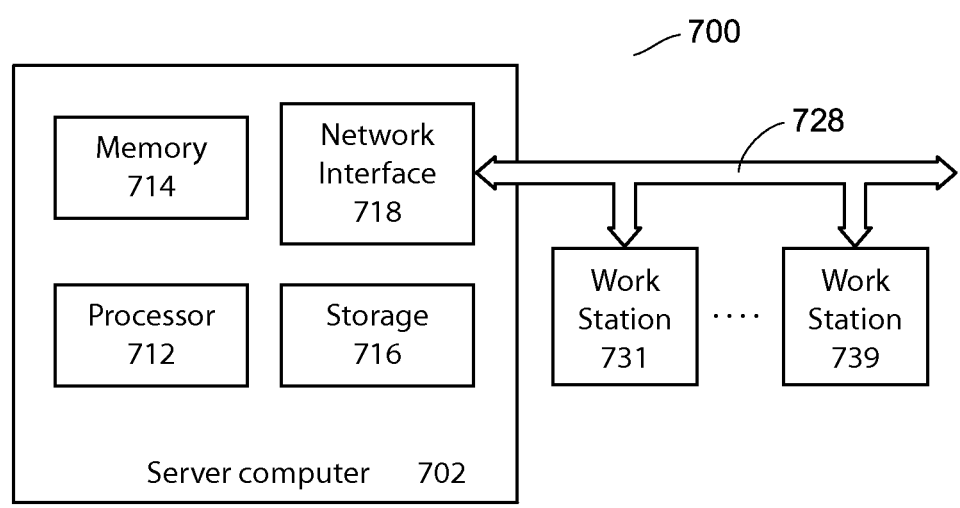
FIG. 7 is a block diagram illustrating an exemplary computing system suitable for implementing embodiments of the present disclosure.

FIG. 7 is a block diagram illustrating an exemplary computing system 700 suitable for implementing various embodiments of the present disclosure. The computing system 700 includes a server computer 702 and a plurality of workstations 731-739 which are connected to the server computer 702 through a networking link 728. The server computer 702 includes a processor 712, a memory 714, a storage 716 and a network interface 718 which facilitates communication with the work stations 731-739. According to an embodiment of the present disclosure, the computer system 700 performs specific operations by the processor 700 to execute one or more sequences of instructions which may be a part of a place and route program contained in the system memory 714. Instructions may be read into the system memory 714 from the storage 716. The storage 716 may also be used to store a layout database generated by the place and route program. In an embodiment, hard-wired circuitry may be used in place of, or in combination with, software instructions to implement the present disclosure. Thus, embodiments of the present disclosure are not limited to any specific combination of hardware circuitry and/or software.

Referring again to FIG. 7, the work stations 731-739 serve as terminals for the server computer 702. Users can enter commands and receive computational results from the computing system 700 through the work stations 731-739.

According to an embodiment, a computer implemented layout method includes placing a circuit cell and an inter-layer via together in a first device layer of an integrated circuit (IC) design, and placing a metal pattern in a second device layer of the IC design. The first inter-layer via and the metal pattern are configured to form a direct connection channel for the circuit cell and the metal pattern.

According to an embodiment, a computer implemented layout method includes placing a circuit cell and an inter-layer via together in a first device layer of an integrated circuit (IC) design, and the first device layer includes at least one active component. A connection between the first circuit cell and a power supply rail within the first device layer is placed, and a metal pattern in a second device layer of the IC design is placed, where the second device layer includes a second power supply voltage connection. The inter-layer via and the metal pattern are configured to form a direct connection channel between the first device layer and the second device layer According to an embodiment, a 3D integrated circuit includes a circuit cell, a metal pattern, and an inter-layer via. The circuit cell is in a first device layer of the 3DIC structure. The metal pattern is in a second device layer of the 3DIC structure. The inter-layer via connects the circuit cell in the first device layer of the 3DIC structure at a predetermined location and connects the metal pattern in the second device layer of the 3DIC structure. The predetermined location is within a cell boundary of the circuit cell in the first device layer of the 3DIC structure.

The foregoing outlines features of several embodiments so that those of ordinary skill in the art may better understand the aspects of the present disclosure. Those skilled in the art should appreciate that they may readily use the present disclosure as a basis for designing or modifying other processes and structures for carrying out the same purposes and/or achieving the same advantages of an embodiment introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A computer implemented layout method, the method comprising:
    bundling, for purposes of placement, a circuit cell and an inter-layer via together as an integral unit;
    placing the integral unit of the circuit cell and the inter-layer via in a first device layer of an integrated circuit (IC) design; and
    placing a metal pattern in a second device layer of the IC design,
    wherein the placing the integral unit of the circuit cell and the inter-layer via forms a direct electrical connection channel between the circuit cell and the metal pattern, and at least one of the above placing operations is performed using a layout generating machine.

2. The method of claim 1, wherein the circuit cell includes at least one active component.

3. The method of claim 1, wherein the circuit cell and the inter-layer via are placed in a location within the first device layer of the IC design, and wherein the location within the first device layer corresponds to a location within the second device layer.

4. The method of claim 3, further comprising placing a power supply line in the first device layer to the circuit cell.

5. The method of claim 3, wherein the first device layer is placed with a first power supply line and the second device layer is placed with a second power supply line.

6. The method of claim 1, wherein the circuit cell includes a voltage level shifter.

7. The method of claim 1, wherein the inter-layer via is configured to carry a power supply voltage, an analog signal or a logic signal.

8. The method of claim 1, further comprising:
    placing a plurality of circuits in the IC design, at least one of the plurality of circuits being connected to the circuit cell;
    evaluating routing and timing violations of the IC design; and
    relocating the circuit cell and the metal pattern to meet a predetermined routing rule and timing goal.

9. The method of claim 1, wherein the IC structure is a monolithic three dimensional IC (3DIC) structure.

10. A computer implemented layout method, the method comprising:
    bundling, for purposes of placement, a circuit cell and the inter-layer via together as an integral unit;
    placing the integral unit of the circuit cell and the inter-layer via in a first device layer of an integrated circuit (IC) design, the first device layer including at least one active component;
    placing a connection between the circuit cell and a power supply rail within the first device layer; and
    placing a metal pattern in a second device layer of the IC design, the second device layer including a second power supply voltage connection,
    wherein the placing the integral unit of the circuit cell and the inter-layer via and the metal pattern forms a direct electrical connection channel between the first device layer and the second device layer;
    evaluating routing and timing violations of the IC design; and relocating the circuit cell along with the metal pattern to meet a predetermined routing rule and timing goal, wherein at least one of the above placing operations is performed using a layout generating machine.

11. The method of claim 10, wherein the circuit cell includes a voltage level shifter.

12. The method of claim 10, wherein the inter-layer via is configured to carry a power supply voltage.

13. The method of claim 10, wherein the inter-layer via is configured to carry an analog or a logic signal.

14. The method of claim 10, further comprising:
placing a plurality of circuits in the IC design, at least one of the plurality of circuits being connected to the circuit cell.

15. The method of claim 10, further comprising
bundling, as an integral unit for purposes of placement, the inter-layer via and the circuit cell, which includes the voltage level shifter; and
wherein the placing a circuit cell and an inter-layer via places the integral unit of the inter-layer via and the circuit cell, which includes the voltage level shifter.

16. A three dimensional integrated circuit (3DIC) structure comprising:
a circuit cell in a first device layer of the 3DIC structure, the circuit cell includes a voltage level shifter;
a metal pattern in a second device layer of the 3DIC structure; and
an inter-layer via connecting the voltage level shifter of the circuit cell in the first device layer at a predetermined location and connecting the metal pattern in the second device layer of the 3DIC structure, the predetermined location being within a cell boundary of the circuit cell in the first device layer of the 3DIC structure;
wherein a footprint of the inter-layer via is at least one order of magnitude smaller than a footprint of the circuit cell.

17. The integrated circuit of claim 16, wherein the predetermined location within the first device layer corresponds to a location within the second device layer.

18. The integrated circuit of claim 16, wherein the inter-layer via is configured to carry a power supply voltage, an analog signal, or a logic signal.

19. The integrated circuit of claim 16, wherein the inter-layer via is vertical or substantially vertical to the first device layer and the second device layer.

20. The integrated circuit of claim 16, wherein:
a footprint of the inter-layer via is two orders of magnitude smaller than a footprint of a through-silicon-via.

\* \* \* \* \*